No. 792,789.   Patented June 20, 1905.

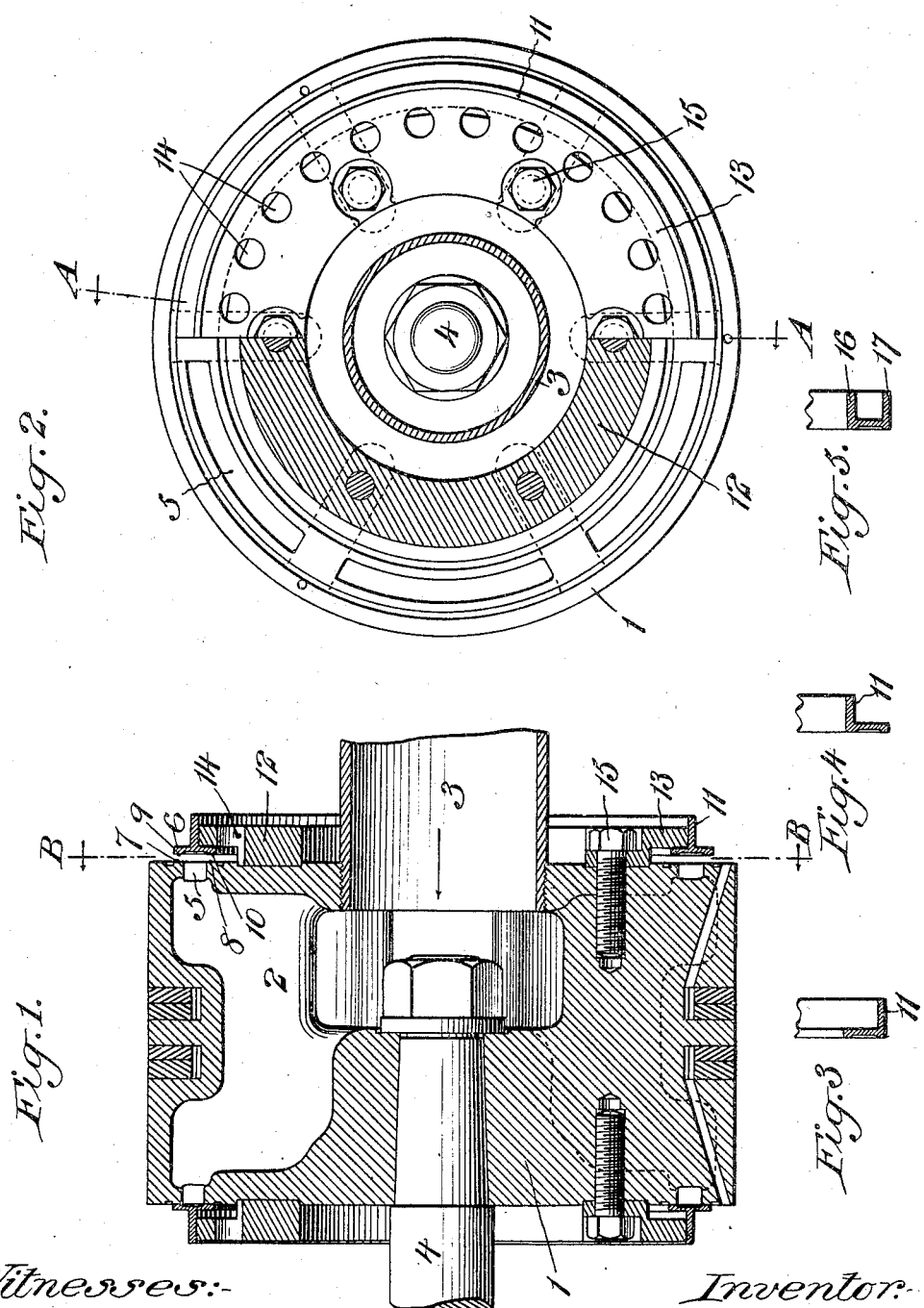

UNITED STATES PATENT OFFICE.

WILLIAM PRELLWITZ, OF EASTON, PENNSYLVANIA, ASSIGNOR TO THE INGERSOLL-SERGEANT DRILL COMPANY, OF NEW YORK, N. Y., A CORPORATION OF WEST VIRGINIA.

COMPRESSOR.

SPECIFICATION forming part of Letters Patent No. 792,789, dated June 20, 1905.

Application filed April 25, 1904. Serial No. 204,745.

*To all whom it may concern:*

Be it known that I, WILLIAM PRELLWITZ, a citizen of the United States, and a resident of Easton, in the county of Northampton and State of Pennsylvania, have invented a new and useful Improvement in Compressors, of which the following is a specification.

This invention consists in an improvement in compressors, such as are commonly known as "air-compressors," but which are also applicable for the compression of other gaseous or aeriform bodies.

The invention particularly relates to improvements in the piston and its valve or valves, and has for its objects to provide certain advantageous features in the construction, form, and assembling of the several parts whereby there is obtained an increased port area, a freer escape for the fluid by the valve, a smaller movement of the valve, and a lighter, less noisy, and more durable valve.

A practical embodiment of my invention is represented in the accompanying drawings, in which—

Figure 1 is a vertical longitudinal section through the piston in the plane of the line A A of Fig. 2 looking in the direction of the arrows. Fig. 2 is a face view of the piston, one-half of the view being taken in section in the plane of the line B B of Fig. 1 looking in the direction of the arrows. Fig. 3 is a detail section showing a second form of annular valve. Fig. 4 is a similar view showing a third form of annular valve, and Fig. 5 is a similar view showing a fourth form of annular valve.

1 designates the piston of the cylinder of a double-acting air-compressor, which piston is hollow and is strengthened internally by radial ribs 2. The central pipe 3 is connected to the piston and constitutes the inlet for the fluid to be compressed. In the example represented the piston is furnished on the side opposite to the pipe 3 with a rod 4 for the purpose of making connection between the piston and the motor for driving it. The piston is provided in one or both of its faces—in the present instance both of its faces—with annular passages 5, located near the periphery of the piston. Annular valves 6 are arranged to open and close the passages 5 as follows: An annular seat 7 is provided exterior to the passage 5 on the face of the piston, and an annular seat 8 is provided interior to the passage 5 on the face of the piston. The annular valve 6 is provided with a valve-face 9 for the seat 7 and a valve-face 10 for the seat 8. This annular valve is further provided with an annular flange 11, giving the valve a T shape in cross-section. This valve is guided in its movement and limited as to its outward movement by a plate 12, which is shown herein as of ring form and provided with a peripheral flange 13, the outer wall of which is fitted to the inner wall of the flange 11 of the valve. This flange 13 of the plate 12 is spaced a short distance from the face of the piston and is of sufficient width to leave a space between the inner wall of the valve and the outer wall of the plate. The plate 12 is provided with an annular series of holes 14, arranged in position to permit the escape of the fluid by the inside of the valve when the valve is open. This plate 12 is secured to the face of the piston 1 by a number of bolts 15, the heads of which bolts are preferably countersunk within the plate. It will thus be seen that the plate serves both as a guide for the valve in its movements toward and away from its seats and also serves as a stop to limit the movement of the valve away from its seats. It is to be understood that the valves are arranged and connected to the piston on both faces of the piston where the piston is used in connection with the cylinder of a double-acting compressor.

In Fig. 3 I have shown the flange 11 as extended from the outer edge of the ring portion of the valve. In Fig. 4 I have shown the flange 11 as extended from the inner edge of the ring portion of the valve, and in Fig. 5 I have shown the ring portion of the valve as being provided with two annular flanges 16 17, projecting from its inner and outer edges.

It will be seen that by the construction herein set forth the annular passage 5 may be located very close to the periphery of the piston, thus giving the passage a large area without making the passage abnormally wide. By permitting the fluid to escape both inside and outside the ring portion of the valve it enables the valve to have a small movement and yet provide the necessary area for the free escape of the fluid. Furthermore, the valve may be made very light, thus materially reducing the noise due to the movement of the valve.

What I claim as my invention is—

1. A hollow piston having an annular passage in its face, an annular valve therefor and a plate secured to the piston engaging the valve, forming a guide for the valve and limiting its outward movement, and holes through the plate for permitting the passage of the fluid by the inside wall of the valve.

2. A hollow piston having annular passages in its opposite faces, annular valves therefor and plates secured to the faces of the pistons engaging the valves, forming guides for the valves and limiting their outward movements, and holes through the plates for permitting the passage of the fluid by the inside walls of the valves.

3. A hollow piston having an annular passage in its face, an annular valve therefor comprising a ring portion and a flange, and a plate secured to the piston provided with an outwardly-extending flange having its periphery in engagement with the inner wall of the valve-flange, forming a guide for the valve and limiting its outward movement.

In testimony that I claim the foregoing as my invention I have signed my name, in presence of two witnesses, this 19th day of April, 1904.

WILLIAM PRELLWITZ.

Witnesses:
WARD RAYMOND,
RUSSELL H. WILHELM.